US009767783B2

(12) United States Patent
Ishida et al.

(10) Patent No.: US 9,767,783 B2
(45) Date of Patent: Sep. 19, 2017

(54) DEVICE AND IMAGE FORMING APPARATUS

(71) Applicants: Masahiro Ishida, Kanagawa (JP); Naoki Matsuda, Kanagawa (JP); Toshiyuki Uchida, Kanagawa (JP); Kazuhiro Kobayashi, Kanagawa (JP); Toshihiro Shimada, Tokyo (JP)

(72) Inventors: Masahiro Ishida, Kanagawa (JP); Naoki Matsuda, Kanagawa (JP); Toshiyuki Uchida, Kanagawa (JP); Kazuhiro Kobayashi, Kanagawa (JP); Toshihiro Shimada, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/010,758

(22) Filed: Jan. 29, 2016

(65) Prior Publication Data

US 2016/0225363 A1 Aug. 4, 2016

(30) Foreign Application Priority Data

Jan. 30, 2015 (JP) ................................ 2015-017169

(51) Int. Cl.
*G10K 11/04* (2006.01)
*G10K 11/172* (2006.01)
(Continued)

(52) U.S. Cl.
CPC .......... *G10K 11/172* (2013.01); *G03G 21/00* (2013.01); *G03G 21/1619* (2013.01)

(58) Field of Classification Search
CPC ....... G03G 21/00; G10K 11/04; G10K 11/172
(Continued)

(56) References Cited

U.S. PATENT DOCUMENTS 4,834,625 A * 5/1989 Grant .................. F04B 39/0033 181/202
5,797,376 A * 8/1998 Frank .................. B60K 15/077 123/509
(Continued)

FOREIGN PATENT DOCUMENTS

JP 8-142447 6/1996
JP 9-230658 9/1997
(Continued)

OTHER PUBLICATIONS

Office Action from corresponding Japanese Patent Application 2015-017169, dated Dec. 2, 2016.

*Primary Examiner* — Forrest M Phillips
(74) *Attorney, Agent, or Firm* — Harness, Dickey & Pierce, P.L.C.

(57) ABSTRACT

A device includes a sound source, an electric board, an exterior member, an electric board container box, and a sound absorber. The sound source generates a sound at a time of operation. The electric board has a circuit mounting an electrical component. The exterior member surrounds the sound source and the electric board. The electric board container box houses the electric board. The sound absorber is at least partially disposed inside a virtual space corresponding to a thickness of the electric board container box in an interior space of the device.

20 Claims, 7 Drawing Sheets

(51) Int. Cl.
*G03G 21/00* (2006.01)
*G03G 21/16* (2006.01)

(58) Field of Classification Search
USPC .......................................... 181/202, 198, 148
See application file for complete search history.

(56) References Cited

U.S. PATENT DOCUMENTS

| | | | | |
|---|---|---|---|---|
| 6,236,575 | B1 * | 5/2001 | Ritter | H01H 50/305 181/198 |
| 7,267,196 | B2 * | 9/2007 | Mathur | G10K 11/175 181/198 |
| 7,684,726 | B2 * | 3/2010 | Suzuki | G03G 15/2064 181/283 |
| 7,712,576 | B2 * | 5/2010 | Goto | F24F 13/24 181/200 |
| 7,835,659 | B2 * | 11/2010 | Moro | G03G 21/1619 181/201 |
| 2004/0190928 | A1 * | 9/2004 | Tsunoda | G01N 1/2202 399/91 |
| 2006/0185931 | A1 * | 8/2006 | Kawar | G06F 1/18 181/202 |
| 2007/0125595 | A1 * | 6/2007 | Sugiyama | G03G 21/00 181/284 |
| 2008/0078611 | A1 * | 4/2008 | Inoue | G06F 1/20 181/206 |
| 2011/0147115 | A1 * | 6/2011 | Ertl | G10K 11/16 181/202 |
| 2015/0110517 | A1 | 4/2015 | Ishida et al. | |
| 2015/0241838 | A1 | 8/2015 | Ishida et al. | |
| 2015/0243274 | A1 | 8/2015 | Hirakawa et al. | |
| 2015/0248880 | A1 * | 9/2015 | Matsuda | G03G 21/1619 399/107 |

FOREIGN PATENT DOCUMENTS

| | | |
|---|---|---|
| JP | 11-109976 | 4/1999 |
| JP | 2000-235396 | 8/2000 |
| JP | 2000-330419 | 11/2000 |
| JP | 2001-117451 | 4/2001 |
| JP | 2002-244380 | 8/2002 |
| JP | 2005-304162 A | 10/2005 |
| JP | 2006-251590 | 9/2006 |
| JP | 2007-316351 | 12/2007 |

* cited by examiner

DEVICE AND IMAGE FORMING APPARATUS

CROSS-REFERENCE TO RELATED APPLICATION

This patent application is based on and claims priority pursuant to 35 U.S.C. §119(a) to Japanese Patent Application No. 2015-017169, filed on Jan. 30, 2015, in the Japan Patent Office, the entire disclosure of which is hereby incorporated by reference herein.

BACKGROUND

Technical Field

Aspects of the present disclosure relate to a device and an image forming apparatus.

Related Art

An electrophotographic image forming apparatus is proposed to include a sound absorber to absorb driving noise of various types of drive units generated during image formation. For example, an image forming apparatus employs, as a sound absorber, a Helmholtz resonator that includes a cavity (resonant space) having a certain degree of volume and a communication portion communicating the cavity with an exterior space An exterior member of an apparatus body has a dual structure of an exterior wall and an interior wall to form the cavity in a space between the exterior wall and the interior wall.

SUMMARY

In an aspect of the present disclosure, there is provided a device that includes a sound source, an electric board, an exterior member, an electric board container box, and a sound absorber. The sound source generates a sound at a time of operation. The electric board has a circuit mounting an electrical component. The exterior member surrounds the sound source and the electric board. The electric board container box houses the electric board. The sound absorber is at least partially disposed inside a virtual space corresponding to a thickness of the electric board container box in an interior space of the device.

In another aspect of the present disclosure, there is provided an image forming apparatus including the device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
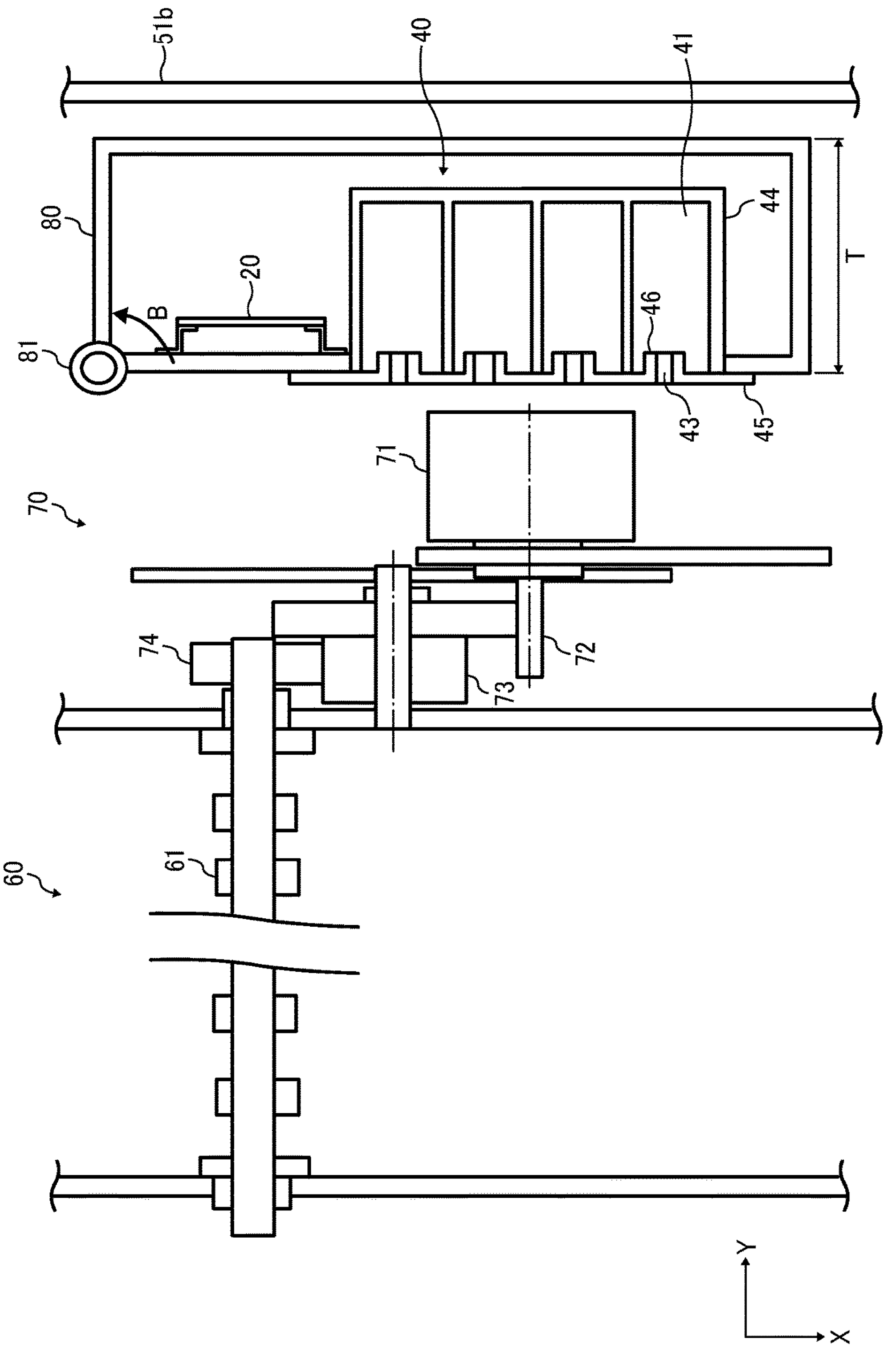
FIG. 1 is an enlarged horizontal cross-sectional view schematically illustrating the vicinity of a drive motor of a copier according to Embodiment 1.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Figure 2:
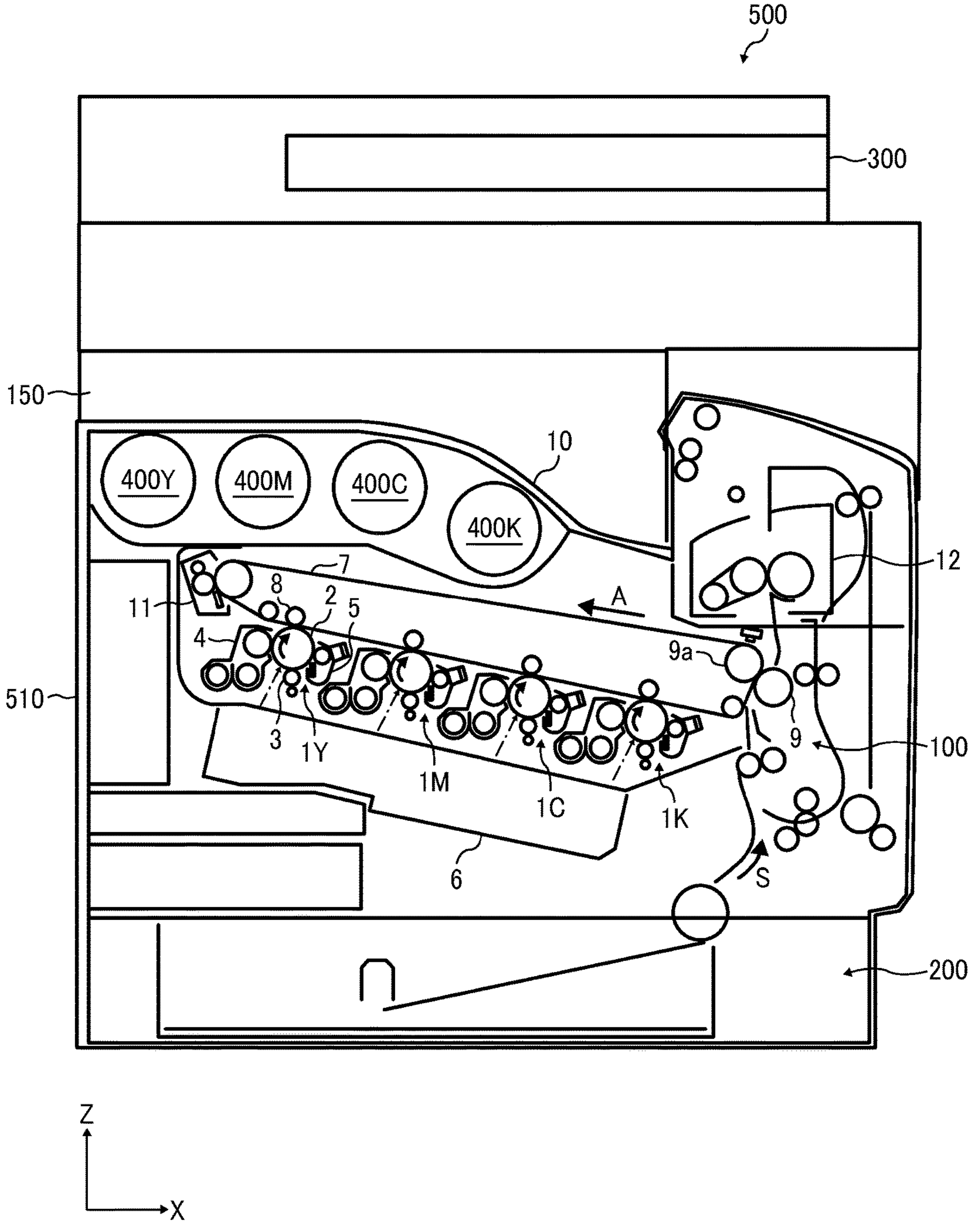
FIG. 2 is a schematic view of a configuration of the copier according to an embodiment.

Hereinafter, a description will be given regarding embodiments in which the present disclosure is applied to a copier (hereinafter, referred to as a copier 500) serving as an image forming apparatus which is a device. FIG. 2 is a schematic view of a configuration of an example of the copier 500 according to an embodiment. The copier 500 includes a copier main unit (hereinafter, referred to as a printer section 100), a sheet feed table (hereinafter, referred to as a sheet feed section 200) and a scanner (hereinafter, referred to as a scanner section 300) which is attached onto the printer section 100.

The printer section 100 is provided with fours process cartridges 1 (1Y, 1M, 1C and 1K) serving as a process unit, an intermediate transfer belt 7, an exposure device 6 serving as an optical scanning unit, a fixing device 12 serving as a fixing unit, and the like. The intermediate transfer belt 7 is an intermediate transferer that is stretched by a plurality of stretching rollers, and moves in a direction indicated by arrow A of FIG. 2. Indices of Y, M, C and K which are attached next to reference numerals of the four process cartridges 1 indicate specifications for yellow, magenta, cyan and black. The four process cartridges 1 (1Y, 1M, 1C and 1K) have substantially the same configuration other than having different colors of toner to be used respectively, and thus, the indices of K, Y, M and C will be omitted in the following description.

The process cartridge 1 is formed to support a photoconductor 2 serving as a latent image bearer, a charger 3 serving as a charging unit, a developing device 4 serving as a developing unit, and a photoconductor cleaning device 5 serving as a cleaner in an integrated manner like a unit. Each of the process cartridges 1 is detachably attached with respect to a body 510 of the copier 500 by releasing a stopper of the process cartridge 1.

The photoconductor 2 rotates in the clockwise direction of the FIG. 2 as illustrated by the arrow in FIG. 2. The charger 3 is a charging roller having a roller shape. The charger 3 is pressed against a surface of the photoconductor 2, and performs driven rotation by rotation of the photoconductor 2. A predetermined bias is applied to the charger 3 by a high-voltage power supply at the time of image formation, and charges the surface of the photoconductor 2. The process cartridge 1 according to the present embodiment uses the roller-shaped charger 3 which comes into contact with the surface of the photoconductor 2 as the charging unit, but the charging unit is not limited thereto, and a non-contact charging system such as corona charging may be used.

The exposure device 6 irradiates the surface of the photoconductor 2 with exposure light, and forms an electrostatic latent image on the surface of the photoconductor 2, based on image information of an original image read by a scanner section 300 or image information to be input from an exterior device such as a personal computer. The photoconductor cleaning device 5 performs cleaning of an untransferred residual toner remaining on the surface of the photoconductor 2 that has passed through a position opposing the intermediate transfer belt 7.

Each of the four process cartridges 1 forms a toner image of each color of yellow, cyan, magenta and black on the photoconductor 2. The four process cartridges 1 are disposed in parallel in a direction of movement of a surface of the intermediate transfer belt 7. The four process cartridges 1 transfer the respective toner images formed on the photoconductors 2 to the intermediate transfer belt 7 so as to sequentially superimpose the respective toner images one on another in order, and form a visible image on the intermediate transfer belt 7.

A primary transfer roller 8 serving as a primary transferer is disposed in a position opposing each of the photoconductors 2 with the intermediate transfer belt 7 interposed therebetween in FIG. 2. A primary transfer bias is applied to the primary transfer roller 8 by the high-voltage power supply, and a primary-transfer electric field is formed between the primary transfer roller 8 and the photoconductor 2. The primary-transfer electric field is formed between the photoconductor 2 and the primary transfer roller 8, and thereby the toner image formed on the surface of the photoconductor 2 is transferred to the surface of the intermediate transfer belt 7. One of the plurality of stretching rollers that stretches the intermediate transfer belt 7 is rotated by a drive motor, and thereby the intermediate transfer belt 7 performs surface movement in the arrow A direction of FIG. 2. The toner images of the respective colors are sequentially superimposed one on another and transferred onto the surface of the intermediate transfer belt 7 performing the surface movement, and thereby a full-color image is formed on the surface of the intermediate transfer belt 7.

A secondary transfer roller 9 is disposed on the downstream side in the direction of movement of the surface of the intermediate transfer belt 7 with respect to a position at which the four process cartridges 1 oppose the intermediate transfer belt 7. The secondary transfer roller 9 is disposed at a position opposing a secondary transfer opposite roller 9*a* serving as one of the stretching rollers with the intermediate transfer belt 7 interposed therebetween, and a secondary transfer nip is formed between the secondary transfer roller 9 and the intermediate transfer belt 7. A secondary-transfer electric field is formed by applying a predetermined voltage between the secondary transfer roller 9 and the secondary transfer opposite roller 9*a*. A transferred sheet serving as a transfer material, which is fed from the sheet feed section 200 and conveyed in a direction indicated by arrow S of FIG. 2, passes through the secondary transfer nip. When the transferred sheet passes through the secondary transfer nip, the full-color image formed on the surface of the intermediate transfer belt 7 is transferred onto the transferred sheet by the secondary-transfer electric field formed between the secondary transfer roller 9 and the secondary transfer opposite roller 9*a*.

The fixing device 12 is disposed on the downstream side in the conveying direction of the transferred sheet with respect to the secondary transfer nip. The transferred sheet which has passed through the secondary transfer nip arrives at the fixing device 12. Then, that full-color image which has been transferred onto the transferred sheet by heating and pressing in the fixing device 12 is fixed, and the transferred sheet to which the image is fixed is discharged to a sheet ejection tray 10. On the other hand, the toner which remains on the surface of the intermediate transfer belt 7 without being transferred onto the transferred sheet at the secondary transfer nip is collected by a transfer-belt cleaning device 11.

Tonner bottles 400 (400Y, 400M, 400C and 400K) that house the respective color toners are disposed above the intermediate transfer belt 7 so as to be detachably attached to the body 510 of the copier 500 as illustrated in FIG. 2. The toners housed in the tonner bottles 400 of the respective colors are supplied to the developing devices 4 of the respective colors by toner supply devices corresponding to the respective colors. The developing device 4 may be any developing system of a two-component development which uses a two-component developer including toner and a carrier and a one-component development which uses a primary transferer developer only including toner.

Figure 3:
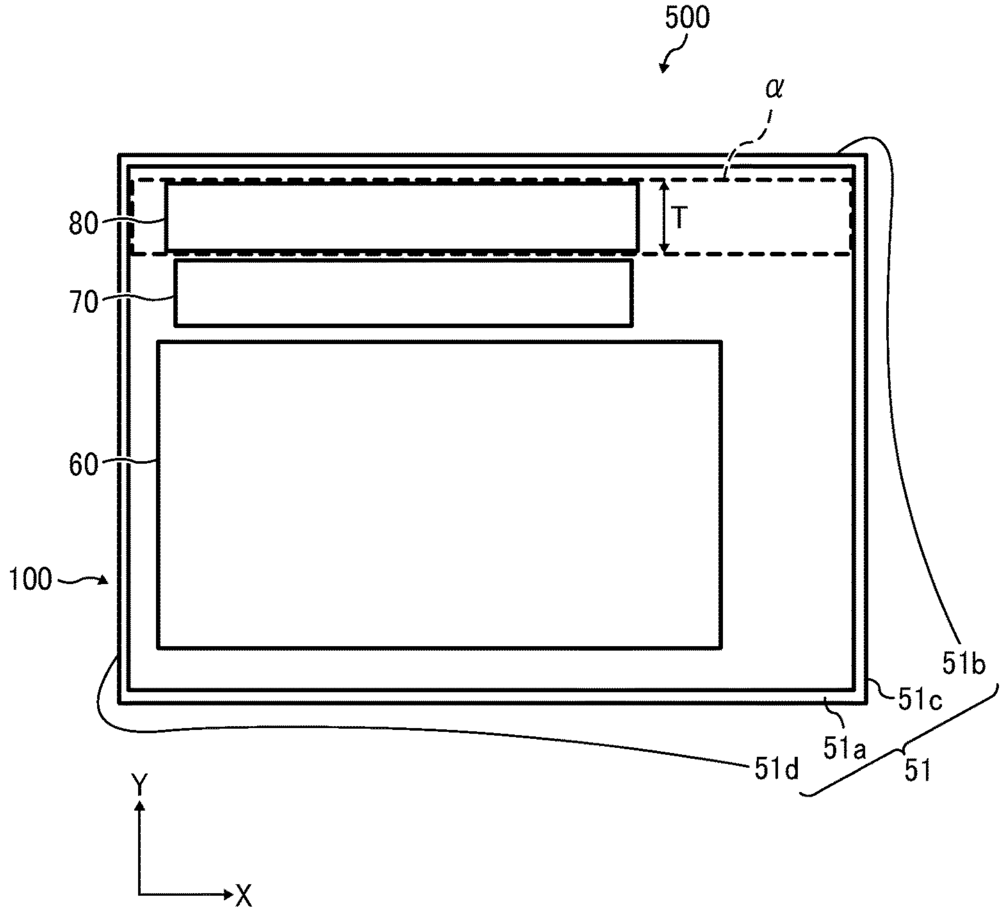
FIG. 3 is a top view of a positional relationship among a driven unit, a drive unit and an electric box in a horizontal cross-section.

FIG. 3 is a top view illustrating a positional relationship among a driven unit 60, a drive unit 70 and an electric box 80 in a horizontal cross-section of the printer section 100 of the copier 500. The process cartridge 1 and the intermediate transfer belt 7 are disposed in the driven unit 60, and the photoconductor 2 and the developing device 4 provide in the process cartridge 1 and a drive roller of the intermediate transfer belt 7 are rotationally driven by input of the rotational drive from the drive unit 70. The exterior side of the printer section 100 is covered with an exterior cover 51, and the exterior cover 51 includes a front-side exterior cover 51*a*, a rear-side exterior cover 51*b*, a right-side exterior cover 51*c*, a left-side exterior cover 51*d*, and the like as illustrated in FIG. 3. The driven unit 60 is disposed in the interior side of the front-side exterior cover 51*a*. The drive unit 70 and the electric box 80 are disposed in the rear side of the front-side exterior cover 51*a*, and the rear side of the electric box 80 is covered with the rear-side exterior cover 51*b*.

In FIG. 3, "α" indicates a virtual space including the electric box 80 in an interior space of the copier 500. In the virtual space, a length in the depth direction of the apparatus (the Y-axial direction of FIG. 3) corresponds to the thickness "T" of the electric box 80, and a length in the lateral direction (the X-axial direction in FIG. 3) corresponds to the entire width of the interior side of the exterior cover 51 of the copier 500. Further, a length in the height direction of the virtual space (the Z-axial direction in FIG. 3) corresponds to the entire height of the interior side of the exterior cover 51 of the copier 500. Hereinafter, the virtual space will be referred to as an "electric box setting space α."

The drive unit 70 includes members such as a motor and a gear which become sound sources, and generates an operation sound at the time of operation. When this operation sound passes through the electric box setting space α and transmits through the rear-side exterior cover 51*b*, the operation sound leaks to the exterior portion of the copier 500, and causes noise. The rear-side exterior cover 51*b* also has an insulation effect to some extent, but cannot be said to be sufficient. In particular, the noise at a low frequency easily transmits, and tends to cause the sound leakage. It is possible to consider disposition of a sound absorbing device that performs the sound absorption of a sound that the rear-side exterior cover 51*b* fails to insulate.

For example, for a configuration in which a sound absorbing device including a Helmholtz resonator is provided in an exterior cover, a space is needed to dispose the sound absorbing device on the rear surface side of the electric box setting space α illustrated in FIG. 3. Such a configuration increases the size of the copier 500 in the depth direction in FIG. 3. On the other hand, in the copier 500 according to the present embodiment, at least a part of the sound absorbing device including the Helmholtz resonator is disposed inside the electric box setting space α which is a range corresponding to the thickness "T" of the electric box 80 in the interior space of the copier 500. Accordingly, it is possible to suppress the increase in length in the depth direction of the copier 500 caused by the provision of the sound absorbing device, and it is possible to suppress an increase in size of the entire copier 500. Hereinafter, a description will be given regarding specific embodiments in which at least a part of the sound absorbing device is disposed inside the electric box setting space α.

Embodiment 1

Next, a description will be given regarding a first embodiment (hereinafter, referred to as "Embodiment 1" of a copier 500 to which the present disclosure is applied. FIG. 1 is an enlarged horizontal cross-sectional view schematically illustrating the vicinity of one drive motor 71 which is provided in a drive unit 70 of the copier 500 according to Embodiment 1. A motor gear 72 is fixed to a rotation shaft (rotor) of the drive motor 71 which is a drive source. The drive motor 71 outputs the rotational drive, and thereby rotational drive is transmitted from the motor gear 72 to a roller gear 74 via an idler gear 73. The roller gear 74 is fixed to a rotation shaft of a drive roller 61 of a driven unit 60, and the drive roller 61 also rotates when the roller gear 74 rotates.

An electric box 80 which has a box shape and houses a printed circuit board 20 is disposed between the drive motor 71 and a rear-side exterior cover 51*b*, and a sound absorbing device 40 using a Helmholtz resonator is attached to the electric box 80. The printed circuit board 20 is fixed to an interior wall surface of the electric box 80, and it is possible to prevent a circuit formed on the printed circuit board 20 from receiving influence of the noise by allowing the printed circuit board 20 to be surrounded by the electric box 80.

Figure 4:
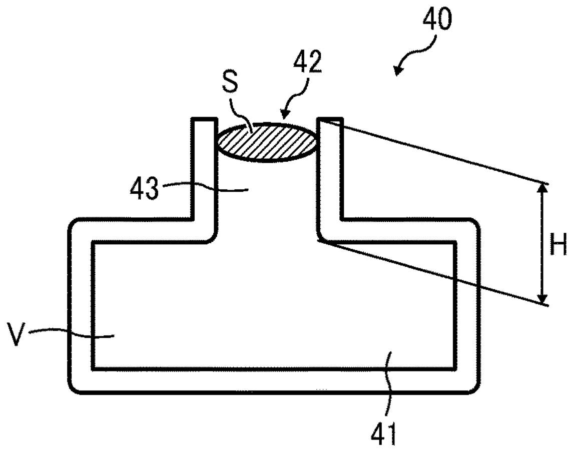
FIG. 4 is a schematic view of a sound absorbing device using a Helmholtz resonator.

FIG. 4 is a schematic view of the sound absorbing device 40 using the Helmholtz resonator. The Helmholtz resonator has a shape like a container with a narrowed inlet, and includes a cavity 41 having a certain degree of volume and a communication portion 43 forming the narrowed inlet which is smaller than that of the cavity 41 as illustrated in FIG. 4, and performs sound absorption of a sound at a specific frequency entering the communication portion 43. When a volume of the cavity 41 is "V," an opening area of an opening portion 42 in the communication portion 43 is "S," a length the communication portion 43 is "H," speed of a sound is set to "c," and a sound absorption frequency in the sound absorbing device 40 is "f," the following Formula (1) is established.

Formula 1

$$f = \frac{c}{2\pi}\sqrt{\frac{S}{V(H+\Delta r)}} \tag{1}$$

In Formula (1), "Δr" is open end correction, and "Δr=0.6r" is generally used when a radius at a time at which a cross-section of the communication portion 43 is circular is "r." It is possible to obtain a frequency of a sound to be absorbed by the sound absorbing device 40, using the volume V of the cavity 41, the length H of the communication portion 43, and the opening area S of the communication portion 43 as represented in Formula (1). The sound absorbing device 40 is provided with a plurality of combinations of the cavity 41 and the communication portion 43, and forms the plurality of Helmholtz resonators as illustrated in FIG. 1. It is possible to perform sound absorption of a plurality of sounds at different frequencies by causing the respective Helmholtz resonators to perform sound absorption of different frequencies in such a configuration provided with the plurality of Helmholtz resonators.

A sound such as an electromagnetic sound of the drive motor 71 or engagement noise of the gear is generated at the time of operation of the drive unit 70. Further, a vibration sound is generated at the time of rotation of a rotator such as the rotor of the drive motor 71 or the gear, and in addition, the vibration is propagated so that another structural body vibrates to generate a vibration sound. In this manner, various types of sounds are generated at the time of operation of the drive unit 70. There is a risk that such an operation sound caused at the time of operation of the drive unit 70 is transmitted to an exterior portion of the copier 500, and becomes noise that causes people therearound discomfort. It is possible to perform the sound absorption of an operation sound that can become the noise, using the sound absorbing device 40 by forming the sound absorbing device 40 in accordance with a frequency of the operation sound to be desirably suppressed from being transmitted to the exterior portion among the above-described operation sounds that can become the noise. For example, the volume of the cavity 41, and the length and the opening area of the communication portion of the sound absorbing device 40 are set in accordance with the frequencies of sounds to be caused at the time of rotation of the motor gear 72, the idler gear 73, and the roller gear 74 to perform the sound absorption of the operation sound.

The sound absorbing device 40 is provided with a communication portion forming plate 45 which forms a wall surface on which the communication portion 43 bringing the cavity 41 into communication with the exterior portion is provided, among wall surfaces forming the cavity 41 of the Helmholtz resonator, and a cavity formation member 44 which forms another wall surface of the cavity 41. The communication portion forming plate 45 may be formed of a resin material or a metal material. It is possible to form the communication portion 43 by subjecting a metal plate to burring at the time of using the metal material. A short pipe portion 46 which has a pipe shape and protrudes in the normal direction of the plate by the burring is formed, and the interior of the short pipe portion 46 becomes the communication portion 43 with the cross-sectional area “S” and the length “H.”

The burring is a processing method in which a hole called a pilot hole is formed in a plate material, and a punch having a larger diameter than that of the pilot hole is pushed into the pilot hole to widen and erect an edge of the pilot hole, and form a short pipe around the opening portion. The communication portion 43 is formed by the burring, and thereby it is possible to form the communication portion 43 without providing an additional member for forming the communication portion 43 with respect to the communication portion forming plate 45 which forms a part of the wall surfaces forming the cavity 41. The communication portion 43 is formed by the burring with respect to the plate material, and thereby it is possible to lengthen the length H of the communication portion 43 than that of a configuration in which only a hole is formed in the plate material (configuration in which the length H of the communication portion 43 becomes a plate thickness). Thus, it is possible to set the opening area S of the communication portion 43 to be relatively high, and to enhance a sound absorption effect in a case in which the frequencies of sounds to be absorbed are the same.

Further, a length of the short pipe portion 46 increases as a difference between the diameter of the punch and a diameter of the pilot hole increases in the burring, and the length “H” of the communication portion 43 increases. Further, it is possible to set a frequency to be subjected to the sound absorption to a low frequency by lengthening the length “H” according to the above-described Formula (1). Thus, according to the configuration of forming the communication portion 43 using the burring, it is possible to form the Helmholtz resonator that performs the sound absorption of a sound at a lower frequency without changing the opening area “S” of the communication portion 43 by reducing the diameter of the pilot hole with respect to the diameter of the punch.

In the configuration of forming the communication portion 43 using the burring, the communication portion forming plate 45 is disposed such that the short pipe portion 46 forming the communication portion 43 enters the interior side of the cavity 41 as illustrated in FIG. 1. There is a risk that a leading edge of the short pipe portion 46 is a sharp edge, but the short pipe portion 46 enters the interior of the cavity 41, and thereby it is possible to prevent a user from coming into contact with an edge of the short pipe portion 46.

Further, the metal material is a material having a higher density than that of the resin material, and thus, it is possible to further suppress the transmitted sound as compared with the configuration of forming the sound absorbing device 40 only using the resin material. Meanwhile, the cavity formation member 44 is made of a resin material. The resin material is a material that can be easily processed as compared with the metal material, and thus, it is possible to secure the volume of the cavity 41 with high accuracy while maintaining a sealing performance as compared with a configuration in which the entire wall surface forming the cavity 41 is regulated by the metal material. The volume of the cavity 41 is secured with high accuracy, and thereby it is possible to perform the sound absorption of a sound at a desired frequency.

A gap which is equal to or more than the thickness of the electric box 80 indicated by “T” of FIG. 1 is formed between the drive unit 70 and the rear-side exterior cover 51*b* in the depth direction (a direction perpendicular to a surface of a printed sheet in FIG. 2, and the vertical direction in FIG. 3) of the copier 500. The sound absorbing device 40 is disposed in the copier 500 according to Embodiment 1 such that the cavity formation member 44 is positioned at the interior side of the electric box 80. Accordingly, at least a part of the sound absorbing device 40 is disposed inside the electric box setting space α which is the virtual space corresponding to the thickness “T” of the electric box 80. Accordingly, it is possible to suppress the increase of distance from the drive unit 70 to the exterior cover 51 caused by the provision of the sound absorbing device 40 through the configuration in which the sound absorbing device 40 using the Helmholtz resonator is provided between the drive unit 70 and the exterior cover 51, and it is possible to suppress the increase in size of the copier 500.

The electric box 80 is a box-like member having approximately a rectangular parallelepiped shape which is made of a metal plate. The metal can suppress the transmitted sound. Thus, the surface of the electric box 80 made of metal opposes the drive unit 70, and thereby even when a sound caused by the drive unit 70 is transmitted to a surface of the electric box 80 on which the sound absorbing device 40 is not provided, it is possible to suppress the transmission of the sound and to suppress the sound leakage. Further, the sound is reflected on the surface of the electric box 80 made of metal, and thereby it is possible to prompt incidence of the sound into the communication portion 43 of the sound absorbing device 40.

The copier 500 is provided with an electrical device portion rotating shaft 81 which supports the electric box 80 to be rotatable. The electric box 80 is rotatable around the electrical device portion rotating shaft 81 by detaching the rear-side exterior cover 51*b*. The rear-side exterior cover 51*b* is detached, and the electric box 80 is rotated in an arrow B direction of FIG. 1, and thereby the electric box 80 retreats. The drive unit 70 is exposed from a rear surface side, and it becomes possible to perform maintenance with respect to the drive unit 70 such as exchange of the drive motor 71. That is, the electric box 80 is opened and closed by being rotated around the electrical device portion rotating shaft 81.

The sound absorbing device 40 is fixed to the electric box 80. The electric box 80 is rotated, and thereby the sound absorbing device 40 retreats together with the electric box 80. Thus, it is possible to maintain ease of the maintenance of the drive unit 70 also in a configuration in which the sound absorbing device 40 is provided close to the drive unit 70. The electric box 80 is not limited to a configuration in which six surfaces of the rectangular parallelepiped are surrounded by the wall surfaces, but may have a configuration in which a space having approximately a rectangular parallelepiped shape is formed using a frame or the like, or a hole is formed in the wall surface.

Figure 5:
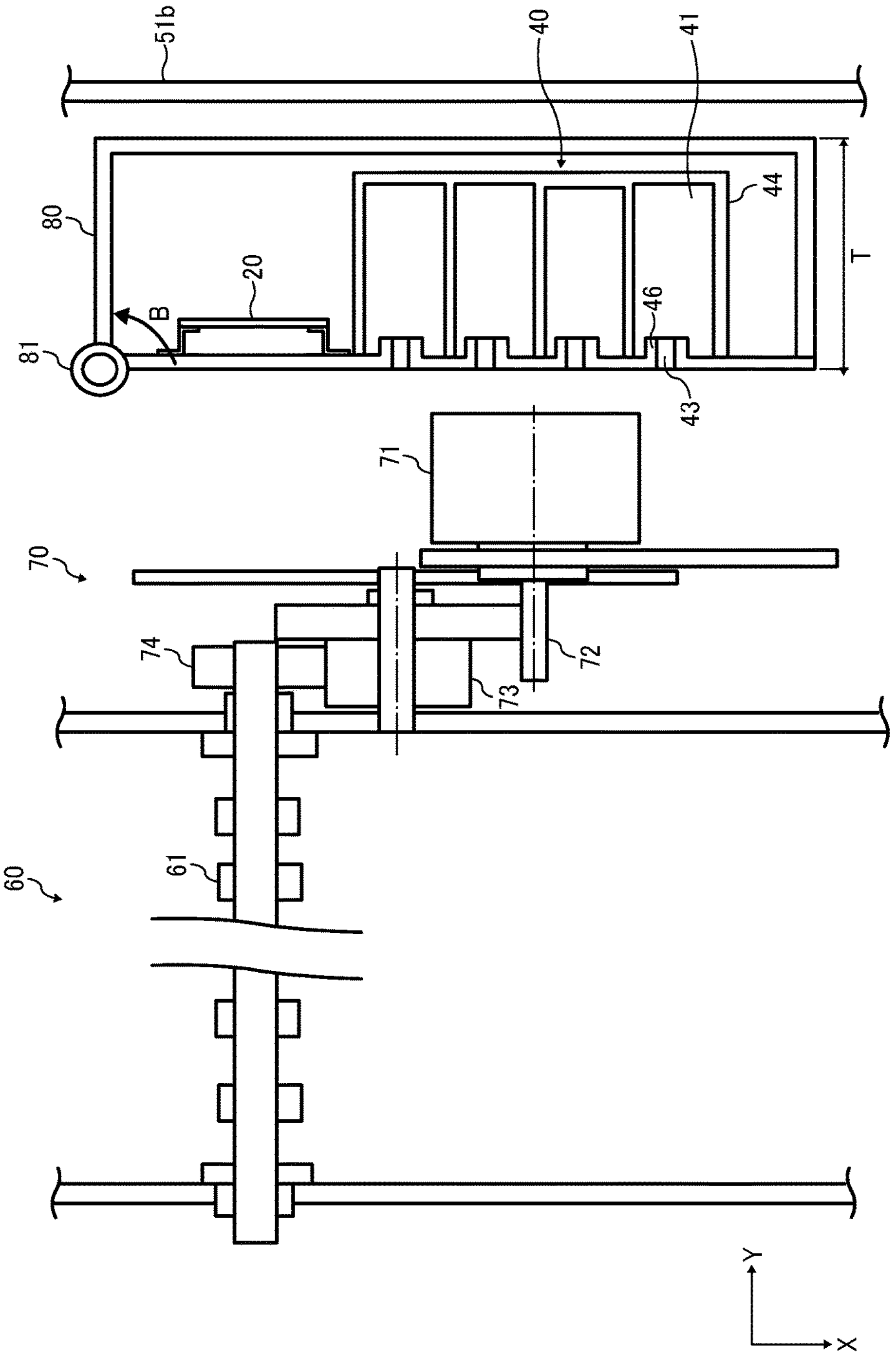
FIG. 5 is an enlarged horizontal cross-sectional view of the vicinity of the drive motor having a configuration in which a communication portion is formed in a part of a wall of the electric box.

FIG. 5 is a configuration in which the communication portion 43 is formed using a part of a wall of the electric box 80 as a communication portion formation member. In the configuration illustrated in FIG. 5, the electric box 80 is made of metal, and the short pipe portion 46 is provided by performing the burring with respect to a metal plate on the drive unit 70 side which forms the electric box 80, and the communication portion 43 is formed. It becomes unnecessary to additionally provide the communication portion formation member by providing the communication portion 43 in the electric box 80 in the configuration illustrated in FIG. 5, and it is possible to achieve reduction of the number of parts, and to suppress cost of disposing the sound absorbing device 40.

In addition, the entire sound absorbing device 40 including the communication portion formation member is positioned in a range of the thickness "T" of the electric box 80, that is, the entire sound absorbing device 40 is positioned inside the electric box setting space α illustrated in FIG. 3. Accordingly, it is possible to suppress the increase of the distance from the drive unit 70 to the exterior cover 51 caused by the provision of the sound absorbing device 40 through the configuration in which the sound absorbing device 40 is provided between the drive unit 70 and the exterior cover 51, and it is possible to suppress the increase in size of the copier 500 as compared with the configuration illustrated in FIG. 1.

Embodiment 2

Figure 6:
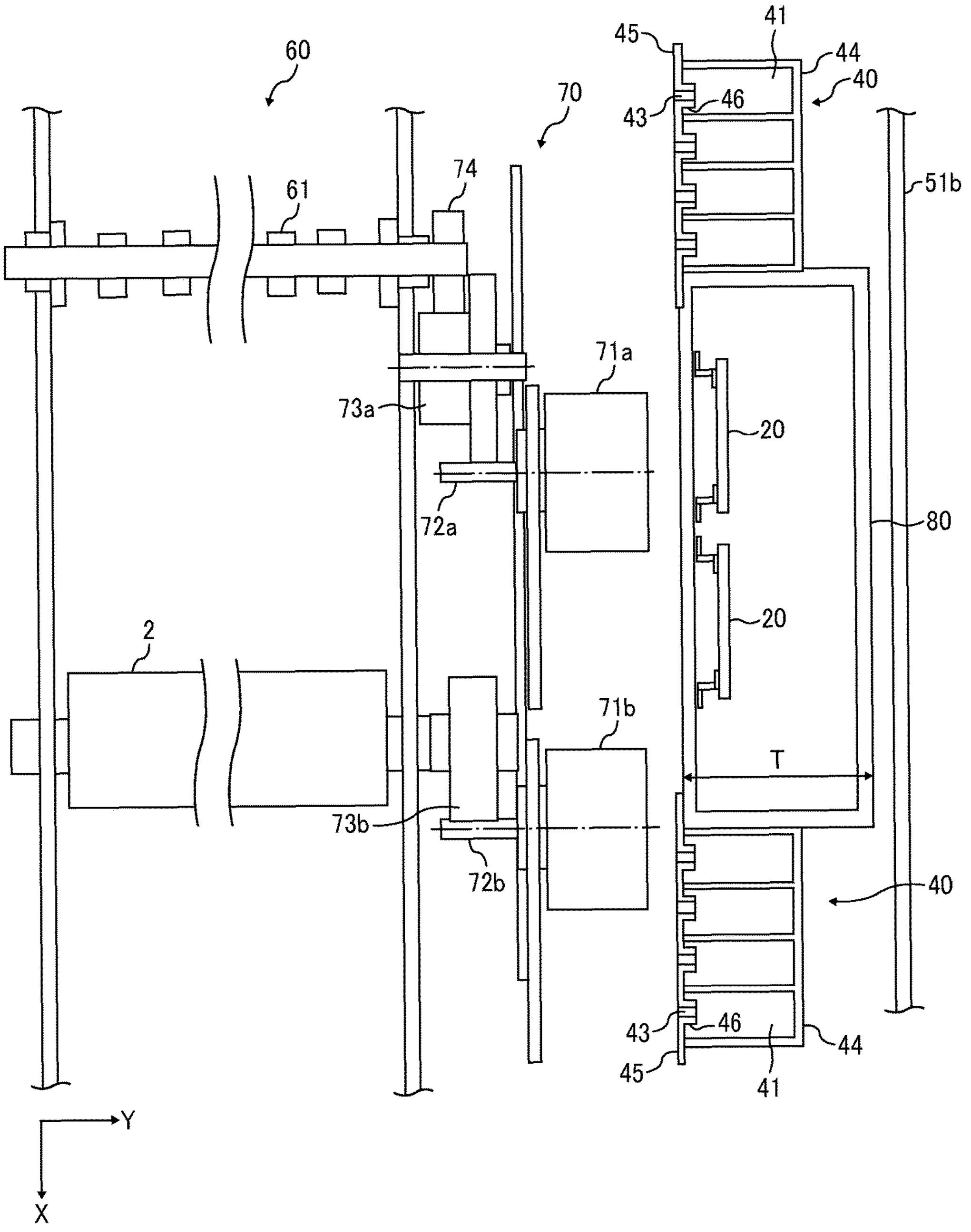
FIG. 6 is an enlarged horizontal cross-sectional view schematically illustrating the vicinity of a drive motor of a copier according to Embodiment 2.

Next, a description will be given regarding a second embodiment (hereinafter, referred to as "Embodiment 2") of a copier 500 to which the present disclosure is applied. FIG. 6 is an enlarged horizontal cross-sectional view schematically illustrating the vicinity of two drive motors 71 (a roller drive motor 71*a* and a photoconductor drive motor 71*b*) provided in a drive unit 70 of the copier 500 according to Embodiment 2. The copier 500 according to Embodiment 2 is different from the copier 500 according to Embodiment 1 in terms of providing a sound absorbing device 40 using a Helmholtz resonator at the exterior side of an electric box 80. A configuration according to Embodiment 2 is in common with the configuration according to Embodiment 1 other than the number of the drive motors 71 and the number of rotators to be rotationally driven by the drive motor 71, and disposition of the sound absorbing device 40, and thus, a description will be omitted regarding the common configuration.

A roller motor gear 72*a* is fixed to a rotation shaft (rotor) of the roller drive motor 71*a*. The roller drive motor 71*a* outputs rotational drive, and thereby the rotational drive is transmitted from the roller motor gear 72*a* to a roller gear 74 via a roller idler gear 73*a*. The roller gear 74 is fixed to a rotation shaft of a drive roller 61 of a driven unit 60. The roller gear 74 rotates, and thereby the drive roller 61 also rotates.

A photoconductor motor gear 72*b* is fixed to a rotation shaft (rotor) of the photoconductor drive motor 71*b*. Then, the photoconductor drive motor 71*b* outputs rotational drive, and there by the rotational drive is transmitted from the photoconductor motor gear 72*b* to a photoconductor 2 via a photoconductor idler gear 73*b* by a joint system. The electric box 80 made of metal, which has a box shape and houses a printed circuit board 20, is disposed between the roller drive motor 71*a* and the photoconductor drive motor 71*b*, and a rear-side exterior cover 51*b*. Then, the sound absorbing device 40 using the Helmholtz resonator is attached to the exterior side in the lateral direction of the electric box 80.

The two sound absorbing devices 40 are provided with a plurality of the Helmholtz resonators which is set to perform sound absorption of driving noise caused by a drive unit 70, in a similar manner to Embodiment 1. The sound absorbing device 40 has a two-body structure including a communication portion forming plate 45 and a cavity formation member 44, in a similar manner to Embodiment 1. The communication portion forming plate 45 forming a wall surface on which a communication portion 43 of a cavity 41 is formed is made of a metal material, and the cavity formation member 44 forming another wall surface of the cavity 41 is made of a resin material.

The electric box 80 is made of metal, and thus, reflection of a sound is caused although transmission of the sound is difficult to cause. Then, when a sound that has been repeatedly reflected between the electric box 80 and a member on the drive unit 70 side arrives at an exterior side in the lateral direction than the electric box 80, there is a risk that the sound passes through an electric box setting space α and leaks from a rear surface side. With respect to this, it is possible to perform sound absorption of the sound which has been repeatedly reflected between the electric box 80 and the drive unit 70 and arrives at the exterior side in the lateral direction than the electric box 80, using the sound absorbing device 40 by disposing the sound absorbing device 40 at the exterior side in the lateral direction of the electric box 80 as in Embodiment 2. Accordingly, it is possible to suppress an operation sound caused by the drive unit 70 from passing through the electric box setting space α, and to suppress generation of the sound leakage.

In the copier 500 according to Embodiment 2, a position in the depth direction (the Y-axial direction in FIG. 6) of at least a part of the sound absorbing device 40 is in a range of a thickness "T" of the electric box 80, although the sound absorbing device 40 is disposed to be positioned at the exterior side of the electric box 80. That is, the sound absorbing device 40 is positioned at the exterior side of the electric box 80, but at least a part of the sound absorbing device 40 is positioned inside the electric box setting space α illustrated in FIG. 3. Accordingly, the sound absorbing device 40 using the Helmholtz resonator is provided between the drive unit 70 and an exterior cover 51, and thereby it is possible to suppress the increase of a distance from the drive unit 70 to the exterior cover 51 caused by the provision of the sound absorbing device 40, and to suppress the increase in size of the copier 500.

Figure 7:
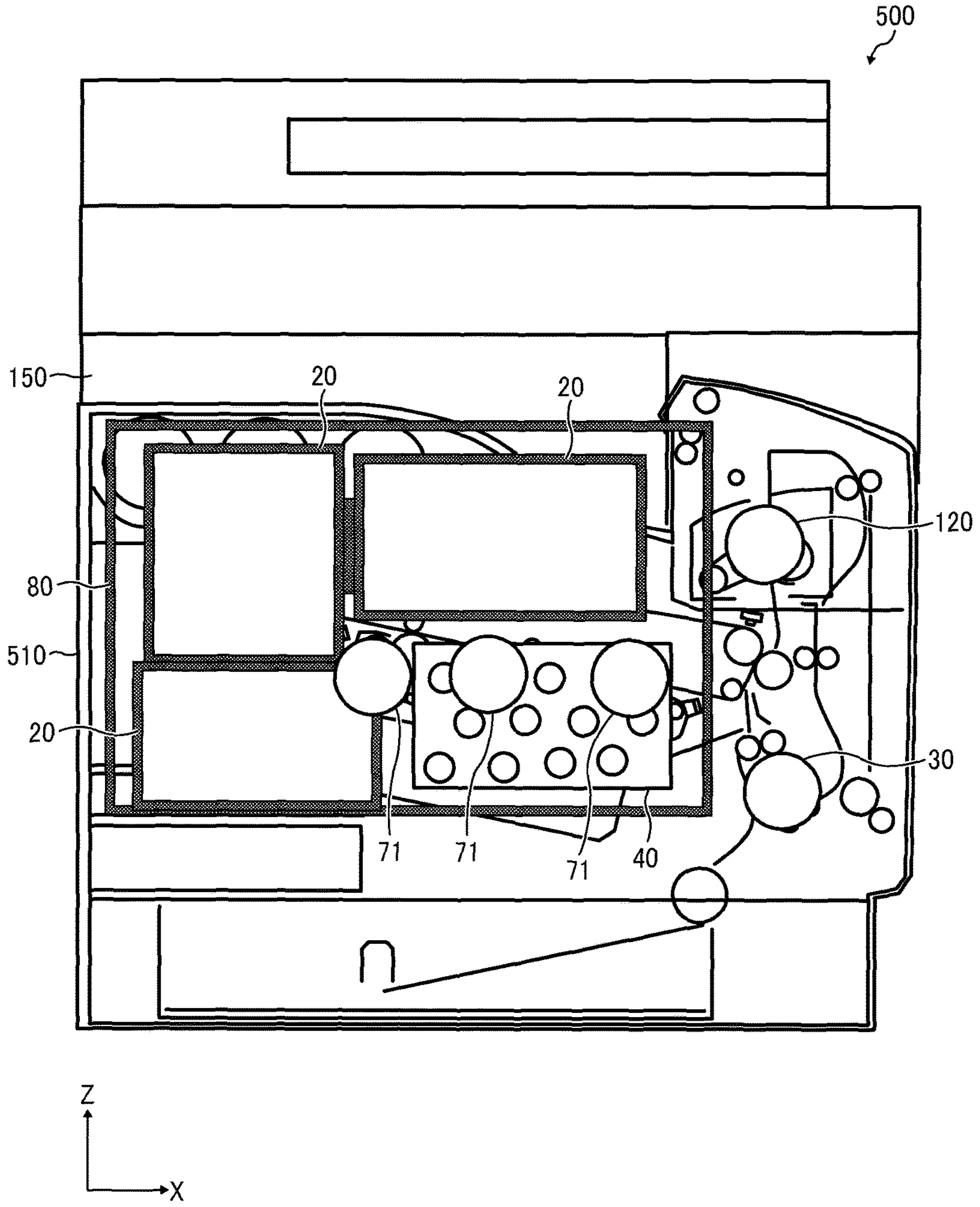
FIG. 7 is an illustration of a positional relationship among a drive motor, an electric box and a sound absorbing device when the copier is seen from a front surface side in a case in which the sound absorbing device is provided inside the electric box.
Figure 8:
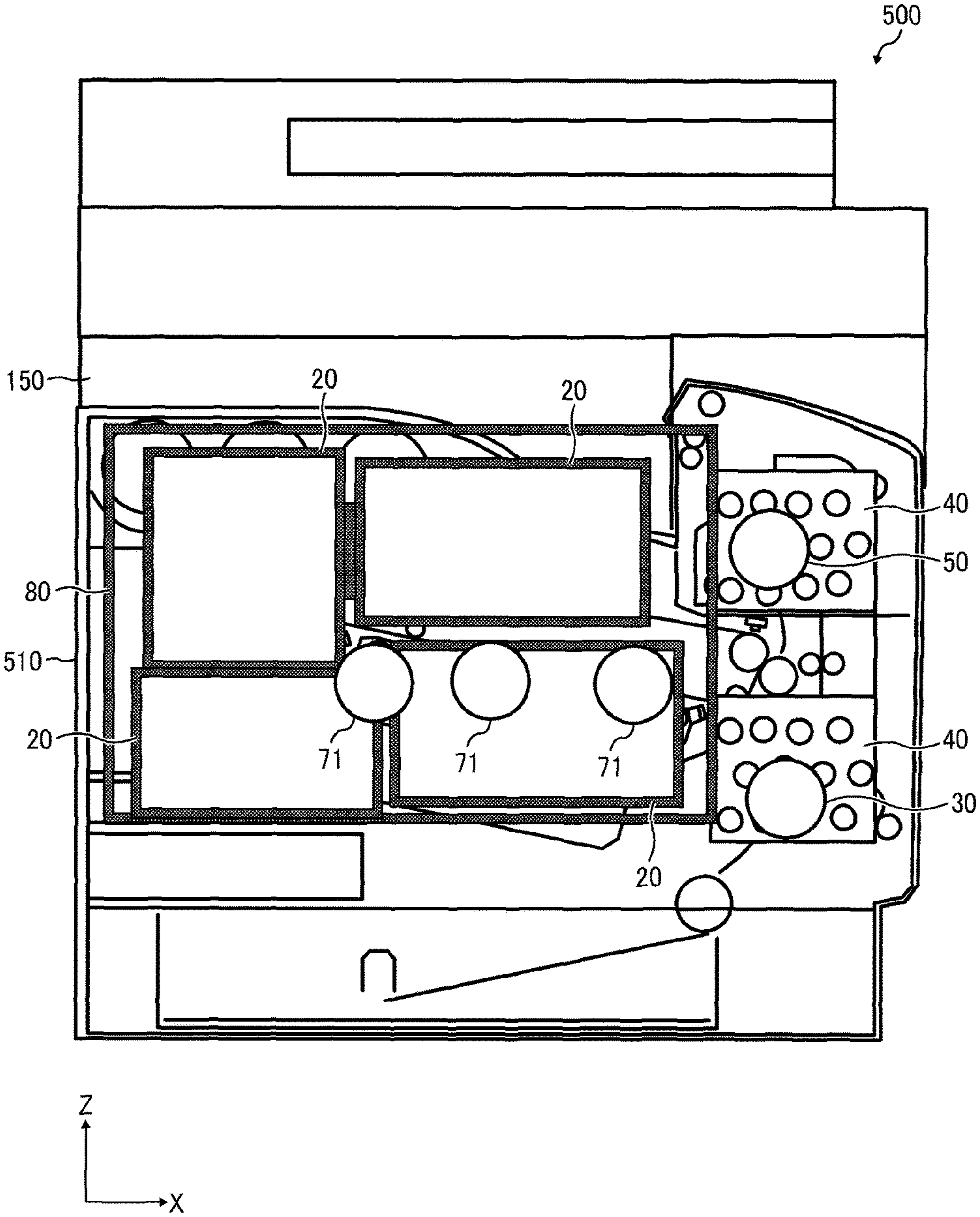
FIG. 8 is an illustration of a positional relationship among the drive motor, the electric box and the sound absorbing device when the copier is seen from the front surface side in a case in which the sound absorbing device is provided outside the electric box.

FIGS. 7 and 8 are illustrations of examples of a positional relationship among the drive motor 71, the electric box 80 and the sound absorbing device 40 when the copier 500 according to the present embodiment is seen from a front surface side. FIG. 7 is the illustration of a case in which the sound absorbing device 40 is inside the electric box 80, and FIG. 8 is the illustration of a case in which the sound absorbing device 40 is outside the electric box 80. Although an upper part of the electric box 80 seems to protrude upward than the sheet ejection tray 10 in FIGS. 7 and 8, the electric box 80 is disposed inside a rear-side casing 150 which is positioned at the rear surface side than the sheet ejection tray 10, and is housed inside an exterior casing.

The printed circuit board 20 is erected and disposed in the present embodiment as illustrated in FIGS. 7 and 8, and thus, a direction parallel to the normal line of the surface of the printed circuit board 20 becomes the depth direction of the apparatus (the Y-axial direction in FIGS. 7 and 8). Further, a circuit equipped with an electrical component is formed in the printed circuit board 20, and various types of the electrical components having different lengths in the normal direction of a surface of the printed circuit board 20 (height on the board) are equipped. Accordingly, the electric box 80 that houses the printed circuit board 20 needs to be set such that the thickness "T" of the electric box 80 is a length capable of housing a height of the printed circuit board 20 at a position at which the electrical component with the highest height on the board is disposed. Thus, a space between a surface of the printed circuit board 20 and an interior wall surface of the electric box 80 becomes a dead space in a part in which an illumination component is not disposed on the board, and a part in which an illumination component with a low height is disposed on the board in an interior space of the electric box 80.

Further, generally, a plurality of the printed circuit boards 20 is disposed inside the single electric box 80 in the case of including the plurality printed circuit boards 20. It is possible to consider the configuration of including a part in which two or more of the printed circuit boards 20 are disposed in the height direction or the lateral direction and a part in which the smaller (than that disposed in the former part) number of printed circuit boards are disposed as illustrated in FIG. 7 regarding a configuration in which the plurality of printed circuit boards 20 is disposed side by side in plural on the same plane. In such a configuration, an interior space of the electric box 80 becomes a dead space over the entire region in the thickness direction in a part in which the printed circuit board 20 is not present on a plane on which the printed circuit boards 20 are disposed.

Further, it is possible to consider a configuration of including a part in which two or more of the printed circuit boards 20 are disposed in the depth direction and a part in which the smaller (than that disposed in the former part) number of printed circuit boards 20 are disposed regarding the configuration of including the plurality of printed circuit boards 20. Since the thickness "T" of the electric box 80 is set in accordance with a length in the depth direction of a part in which the number of boards is the largest in such a configuration, a space between the surface of the printed circuit board 20 and an interior wall surface of the electric box 80 becomes a dead space in the part in which the number of the printed circuit boards 20 is small.

It is possible to consider a method of forming the electric box 80 along a shape of the printed circuit board 20 of an interior portion as a method of reducing the dead space, but processing cost of the electric box 80 increases, which is not practical. Thus, the electric box 80 has approximately the rectangular parallelepiped shape in accordance with a length of a part in which each of a width, a height, and a depth of the printed circuit board 20 to be housed in the interior portion becomes maximum, and the dead space as described above is to be formed.

At least a part of the sound absorbing device 40 is disposed to be positioned inside the interior portion of the electric box 80, as illustrated in FIGS. 1, 5 and 7, in the case of the configuration in which the dead space is formed in the interior space of the electric box 80 as above. Then, at least a part of the sound absorbing device 40 is provided in the part which becomes the dead space of the interior portion of the electric box 80, and thereby it is possible to suppress the increase in size of the copier 500 caused by the provision of the sound absorbing device 40. Further, the sound absorbing device 40 is provided at a position which is adjacent to and opposes the drive motor 71 as a sound source as illustrated in FIGS. 1, 5 and 7, and thereby it is possible to perform the sound absorption before the operation sound of the drive motor 71 spreads, and to achieve the improvement of sound absorption efficiency.

On the other hand, the sound absorbing device 40 is disposed at a position which is the exterior side in the lateral direction or in the height direction of the electric box 80 as illustrated in FIGS. 6 and 8 in a case in which the dead space of the interior space of the electric box 80 is small. At this time, at least a part of the sound absorbing device 40 is disposed to be positioned inside the electric box setting space α.

The electric box 80 occupies a significantly large region in an X-Z plane of the interior space of the copier 500, and is disposed to shield a near side and a far side with the electric box 80 interposed therebetween as illustrated in FIGS. 3, 7 and 8. Thus, it is difficult to set a configuration in which, for example, some members to form the drive unit 70 are disposed at the near side of the electric box 80, and the other members to form the drive unit 70 are disposed at the far side of the electric box 80. Then, the members to form the drive unit 70 tend to be disposed collectively at the near side of the electric box 80, and the exterior side of the electric box 80 in the electric box setting space α easily becomes the dead space. At least a part of the sound absorbing device 40 is provided in the part to become the dead space of the exterior side of the electric box 80 as illustrated in FIGS. 6 and 8, and thereby it is possible to suppress the increase in size of the copier 500 caused by the provision of the sound absorbing device 40.

The cavity of the Helmholtz resonator requires a certain degree of volume, and there is a risk of leading the increase in size of the entire apparatus when the sound absorbing device 40 provided with the cavity 41 as above is added. Since the cavity 41 of the sound absorbing device 40 is provided in the interior portion of the electric box 80 or the part to become the dead space of the exterior portion in the copier 500 according to the present embodiment, it is possible to suppress the increase in size of the entire apparatus.

Further, there may be a case in which a sound source (noise source) which is positioned at the exterior side than the electric box 80 is present on a projection surface of the X-Z plane such as the fixing drive motor 50 and the conveyance drive motor 30 when the copier 500 is seen from the front surface side as illustrated in FIG. 8. In such a case, it is possible to prevent operation sounds of the fixing drive motor 50 and the conveyance drive motor 30 from leaking from the rear surface side by disposing the sound absorbing device 40 between the fixing drive motor 50 or the conveyance drive motor 30, as the sound source, and the rear-side exterior cover 51*b* as illustrated in FIG. 8.

The Helmholtz resonator can perform the sound absorption before a sound spreads as being disposed at a position closer to the sound source which is a target of the sound absorption, and the sound absorption efficiency increases. Here, it is necessary to dispose the sound source close to the exterior member in order to dispose the sound absorbing device to a position close to the sound source in the configuration in which the sound absorbing device using the Helmholtz resonator is disposed in the exterior member. An additional shielding object is not provided between the sound source and the exterior member according to such disposition, and thus, the exterior member is the only shielding object to prevent a sound from leaking to the exterior portion, and there is a risk that a sound which has failed to be absorbed by the sound absorbing device transmits through the exterior member, and leaks to the exterior portion.

On the contrary, the electric box 80 which functions as a shielding object of a sound is provided between the drive unit 70 including the member as the sound source and the exterior cover 51 in the copier 500 according to the present embodiment. Thus, a sound which has failed to be absorbed by the sound absorbing device 40 transmits through the electric box 80 which is the shielding object, or cannot leak from the rear-side exterior cover 51*b* side unless being diffracted to avoid the electric box 80. Since the sound is attenuated at the time of transmission and diffraction, it is possible to decrease the sound arriving at the rear-side exterior cover 51*b*, and it is possible to suppress the sound leakage from the rear-side exterior cover 51*b* side.

Further, it is possible to consider forming a wall portion which forms the cavity, so as to protrude from an interior wall surface of the exterior cover as a configuration in which the sound absorbing device using the Helmholtz resonator is provided in the exterior member. However, there is a risk that a recess called shrinkage is caused on an exterior wall surface, and the quality of exterior is degraded in a part of the exterior cover in which the wall portion is provided on the interior wall surface. On the contrary, the sound absorbing device 40 is provided as a different member from the exterior cover 51 in the copier 500 according to the present embodiment, and thus, it is possible to maintain the quality of exterior without causing the shrinkage on the exterior wall surface of the exterior cover 51.

Further, a sound at a high frequency is difficult to transmit, and can be shielded to some extent by the electric box 80 and the rear-side exterior cover 51*b*. However, a sound at a low frequency such as a sound caused by engagement of the gear, easily transmits, and it is difficult to sufficiently prevent the sound leakage only using a shield. With respect to this, the sound absorbing device 40 provided in the copier 500 is set to perform the sound absorption of the sound at the low frequency. Accordingly, the sound at the high frequency can be shielded by the electric box 80 or the rear-side exterior cover 51*b* while the sound at the low frequency is absorbed by the sound absorbing device 40, and thus, it is possible to efficiently suppress the generation of the sound leakage.

The description has been given regarding the case in which the sound source causing the operation sound is the drive unit 70 which drives the photoconductor 2 and the intermediate transfer belt 7 in the present embodiment. The sound source is not limited to the drive unit 70, and may be any place that causes an operation sound such as an exposure device or a sheet feed section. Although the copier 500 according to the present embodiment has the configuration in which the electric box 80 is disposed at a position adjacent to the rear-side exterior cover 51*b*, the present disclosure can also be applied to a configuration in which the electric box 80 is disposed at a position adjacent to another exterior cover 51 (51*a*, 51*c* or 51*d*). In this case, it is possible to suppress sound leakage from the exterior cover 51 to which the electric box 80 is adjacent.

Although the description has been given by exemplifying the configuration in which the copier 500 as the image forming apparatus is a color image forming apparatus in the present embodiment, the present disclosure can also be applied similarly to a monochrome image forming apparatus. Further, the image forming apparatus is not limited to the electrophotographic image forming apparatus, and can also be applied to an image forming apparatus such as an ink jet system. In addition, the device is not limited to the image forming apparatus, and can be applied to any apparatus provided with a sound source that generates an operation sound at the time of operation. Furthermore, the device is not limited to an apparatus using a Helmholtz resonator as the sound absorber, and may be any apparatus having a certain degree of volume to allow the sound absorber to be disposed.

The above descriptions are exemplary, and the present disclosure has a unique effect for each of the following aspects.

Aspect A

A device, such as a copier 500, includes a sound source, such as a drive unit 70, to generate a sound at the time of operation, an electric board such as a printed circuit board 20 with a circuit mounting an electrical component, an exterior member, such as an exterior cover 51, surrounding the sound source and the electric board, and a sound absorber, such as a sound absorbing device 40, and the device is provided with an electric board container box, such as an electric box 80, which houses the electric board in an interior portion of the electric board container box. At least a part of the sound absorber is disposed inside a virtual space (such as an electric box setting space α) corresponding to a thickness of the electric board container box in an interior space of the device. Accordingly, a sound generated from the sound source is shielded by the electric board container box disposed inside the virtual space, or is absorbed by the sound absorber of which at least a part is disposed inside the virtual space as described regarding the above-described embodiments. Thus, it is possible to suppress transmission of the sound generated from the sound source to the exterior member at the opposite side to the sound source with the virtual space interposed therebetween, and it is possible to suppress generation of sound leakage from the exterior member at the opposite side. In addition, at least a part of the sound absorber is disposed inside the virtual space, and thereby it is possible to suppress an increase in length in the thickness direction of the electric board container box, for example, in the depth direction of the device, caused by the provision of the sound absorber, and it is possible to suppress an increase in size of the entire device. Thus, it is possible to achieve reduction in size of the device provided with the sound absorber.

Aspect B

In the device according to Aspect A, the electric board container box, such as the electric box 80, is made of metal. Accordingly, it is possible to suppress the sound from transmitting through the electric board container box and arriving at an exterior portion, such as a rear-side exterior cover 51*b*, and it is possible to suppress the generation of the sound leakage, because the metal has a high density, and can suppress the transmission of the sound as described regarding the above-described embodiments.

Aspect C

In the device according to any aspect of Aspects A and B, the electric board container box, such as the electric box 80, is rotatable with respect to a body, such as a body 510, of the device. Accordingly, a maintenance property of a member provided in the sound source, such as the drive motor 71, is improved as described regarding the above-described embodiments.

Aspect D

In the device according to any aspect of Aspects A to C, At least a part of the sound absorber, such as a sound absorbing device 40, is disposed at an interior side of the electric board container box, such as the electric box 80. Accordingly, a dead space is easily caused in the interior space of the electric board container box, and at least a part of the sound absorber is disposed in a space which becomes the dead space, and thereby, it is possible to realize effective utilization of the space as described regarding the above-described embodiments.

Aspect E

In the device according to any aspect of Aspects A to D, the sound absorber such as the sound absorbing device 40 employs a Helmholtz resonator. Accordingly, it is possible to suppress the increase in length in the thickness direction, for example, in the depth direction of the device caused by the provision of the sound absorber even in the configuration in which the sound absorber provided with a cavity such as a cavity 41 having a certain degree of volume is added, as described regarding the above-described embodiments. Thus, it is possible to suppress the increase in size of the entire device.

Aspect F

In the device according to Aspect E, the Helmholtz resonator includes a plurality of walls forming a cavity. At least one wall of the plurality of walls includes a communication portion, such as a communication portion 43, communicating an interior of the cavity with an exterior of the cavity. The at least one wall is made of metal. Accordingly, the metal has a high density and it is possible to suppress the transmitted sound, and thus, it is possible to suppress the sound leakage as described regarding the above-described embodiments.

Aspect G

In the device according to Aspect E, the communication portion, such as the communication portion 43, is formed by drawing, such as burring. Accordingly, a diameter of a pilot hole before being subjected to processing is set to be small, and thereby it is possible to form the sound absorber, such as the sound absorbing device 40, that performs sound absorption of a sound at a lower frequency, without changing an opening area "S" of the communication portion, such as the communication portion 43, as described regarding the above-described embodiments.

Aspect H

In the device according to any aspect of Aspects E to G, the Helmholtz resonator includes a plurality of walls surrounding a cavity, such as the cavity 41. At least one wall of the plurality of walls includes a communication portion, such as the communication portion 43, communicating an interior of the cavity with an exterior of the cavity. One or more wall other than the at least one wall of the plurality of walls is made of resin. Accordingly, it is possible to secure the volume of the cavity with high accuracy, because the resin material is a material which is easy to process as compared with the metal material, and it becomes possible to perform the sound absorption of a sound at a desired frequency as described regarding the above-described embodiments.

Aspect I

In the device according to any aspect of Aspects A to H, the sound source, such as a drive unit 70, is a drive transmitter that transmits drive from a drive source through engagement with a gear, and a frequency of a sound to be absorbed by the sound absorber, such as the sound absorbing device 40, is set in accordance with a frequency of a sound which is caused by the engagement of the gear. Accordingly, it is possible to suppress leakage of the sound caused by the engagement of the gear to the exterior portion of the apparatus as described regarding the above-described embodiments.

Aspect J

An image forming apparatus such as the copier 500 that forms an image in a recording medium such as a transferred sheet is provided with a configuration of the device according to any aspect of Aspects A to I. Accordingly, it is possible to achieve reduction in size of the image forming apparatus with the configuration provided with the sound absorber that performs the sound absorption of an operation sound of the image forming apparatus as described regarding the above-described embodiments.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A device comprising:

a sound source configured to generate a sound at a time of operation;

an electric board configured to mount an electrical component thereon;

an exterior member surrounding the sound source and the electric board;

an electric board container box configured to house the electric board, the electric board container box being in an interior space of the device; and a sound absorber at least partially inside the electric board container box, the sound absorber including a communication port forming an opening portion and a cavity formation member forming a cavity, the opening portion being open to the sound source, a distance in a depth direction from the opening portion to the cavity formation member being smaller than a thickness (T) of the electric board container box.

2. The device according to claim 1, wherein the electric board container box is made of metal.

3. The device according to claim 1, wherein the exterior member includes a cover, and the electric board container box is configured to rotate with the cover.

4. The device according to claim 1, wherein the sound absorber is at least partially attached to an interior side of the electric board container box.

5. The device according to claim 1, wherein the sound absorber includes a Helmholtz resonator.

6. The device according to claim 5, wherein the Helmholtz resonator includes a plurality of walls surrounding a cavity, at least one wall of the plurality of walls includes the communication port therein, the communication port configured to transmit the sound to the cavity, and the at least one wall is made of metal.

7. The device according to claim 6, wherein the communication port is formed via a drawing operation by pulling the metal to generate the communication port.

8. The device according to claim 5, wherein the Helmholtz resonator includes a plurality of walls surrounding a cavity, at least one wall of the plurality of walls includes the communication port therein, the communication port configured to transmit the sound to the cavity, and one or more wall other than the at least one wall of the plurality of walls is made of resin.

9. The device according to claim 1, wherein the sound source is a drive transmitter configured to transmit drive from a drive source through engagement with a gear, and the sound absorber is configured to absorb a frequency of a sound in accordance with a frequency of a sound generated by the engagement of the gear.

10. An image forming apparatus comprising:

the device according to claim 1.

11. A device comprising:

a sound source configured to generate a sound at a time of operation;

an electric board configured to mount an electrical component thereon;

an exterior member surrounding the sound source and the electric board;

an electric board container box configured to house the electric board, the electric board container box being in an interior space of the device; and a sound absorber adjacent to the electric board container box in the interior space of the device, the sound absorber including a communication port forming an opening portion and a cavity formation member forming a cavity, the opening portion being open to the sound source, a distance in a depth direction from the opening portion to the cavity formation member being smaller than a thickness of the electric board container box.

12. The device according to claim 11, wherein the electric board container box is made of metal.

13. The device according to claim 11, wherein the exterior member includes a cover, and the electric board container box is configured to rotate with the cover.

14. The device according to claim 11, wherein the sound absorber is at least partially attached to an interior side of the electric board container box.

15. The device according to claim 11, wherein the sound absorber includes a Helmholtz resonator.

16. The device according to claim 15, wherein the Helmholtz resonator includes a plurality of walls surrounding a cavity, at least one wall of the plurality of walls includes the communication port therein, the communication port configured to transmit the sound to the cavity, and the at least one wall is made of metal.

17. The device according to claim 16, wherein the communication port is formed via a drawing operation by pulling the metal to generate the communication port.

18. The device according to claim 15, wherein the Helmholtz resonator includes a plurality of walls surrounding a cavity, at least one wall of the plurality of walls includes the communication port therein, the communication port configured to transmit the sound to the cavity, and one or more wall other than the at least one wall of the plurality of walls is made of resin.

19. The device according to claim 11, wherein the sound source is a drive transmitter configured to transmit drive from a drive source through engagement with a gear, and the sound absorber is configured to absorb a frequency of a sound in accordance with a frequency of a sound generated by the engagement of the gear.

20. An image forming apparatus comprising:

the device according to claim 11.

* * * * *